(12) United States Patent
Wang et al.

(10) Patent No.: US 9,759,463 B2
(45) Date of Patent: Sep. 12, 2017

(54) RECEIVER DRYER, METHOD OF MANUFACTURING RECEIVER DRYER AND AIR-CONDITIONING SYSTEM

(71) Applicant: ZHEJIANG SANHUA AUTOMOTIVE COMPONENTS CO., LTD., Hangzhou, Zhejiang (CN)

(72) Inventors: Lixin Wang, Hangzhou (CN); Zhengwei Wang, Hangzhou (CN)

(73) Assignee: Zhejiang Sanhua Automotive Components Co., Ltd., Hangzhou, Zhejiang (CN)

( * ) Notice: Subject to any disclaimer, the term of this patent is extended or adjusted under 35 U.S.C. 154(b) by 393 days.

(21) Appl. No.: 14/380,707

(22) PCT Filed: Feb. 4, 2013

(86) PCT No.: PCT/CN2013/071323
§ 371 (c)(1),
(2) Date: Aug. 22, 2014

(87) PCT Pub. No.: WO2013/127291
PCT Pub. Date: Sep. 6, 2013

(65) Prior Publication Data
US 2015/0033788 A1 Feb. 5, 2015

(30) Foreign Application Priority Data

Feb. 27, 2012 (CN) .......................... 2012 1 0046481

(51) Int. Cl.
*F25B 43/00* (2006.01)
*B01D 15/00* (2006.01)
(Continued)

(52) U.S. Cl.
CPC ............ *F25B 43/003* (2013.01); *B23P 15/26* (2013.01); *F25B 43/00* (2013.01); *B01D 15/00* (2013.01);
(Continued)

(58) Field of Classification Search
CPC .... F25B 43/003; F25B 43/00; F25B 2400/16; F25B 2400/162; B01D 27/02;
(Continued)

(56) References Cited

U.S. PATENT DOCUMENTS 4,495,072 A * 1/1985 Fields .................... B01D 29/17
210/238
2002/0108896 A1 * 8/2002 Malkin .................. B01D 29/15
210/232

(Continued)

FOREIGN PATENT DOCUMENTS

CN 2767923 Y 3/2006
CN 101545704 A 9/2009
(Continued)

OTHER PUBLICATIONS

International Search Report from corresponding or related International Application No. PCT/CN2013/071323.
(Continued)

*Primary Examiner* — Matthew O Savage
(74) *Attorney, Agent, or Firm* — Wolf, Greenfield & Sacks, P.C.

(57) ABSTRACT

A receiver dryer includes a first body and a second body, one end of the second body away from the first body defining first and second connecting ports. The receiver dryer includes a filter cartridge including a first mating portion, a second mating portion, and a filter part at a middle portion; the first mating portion fits with an inner wall of the second body, one space allowing refrigerant to flow is formed
(Continued)

between the filter part and the inner wall of the second body, the second mating portion is connected to the second connecting port, the space between the filter part and the inner wall of the second body communicates with the first connecting port, an inside of the filter part communicates with the second connecting port via the second mating portion, and refrigerant is filtered at least once when flowing between the first and second connecting ports.

18 Claims, 12 Drawing Sheets

(51) Int. Cl.

| | | |
|---|---|---|
| *B01D 36/02* | (2006.01) | |
| *B01D 24/10* | (2006.01) | |
| *B01D 29/05* | (2006.01) | |
| *B01D 29/13* | (2006.01) | |
| *B23P 15/26* | (2006.01) | |
| *B01D 24/14* | (2006.01) | |
| *B01D 27/00* | (2006.01) | |
| *B01D 27/14* | (2006.01) | |
| *B01D 29/01* | (2006.01) | |
| *B01D 29/00* | (2006.01) | |
| *B01D 24/02* | (2006.01) | |
| *B01D 27/02* | (2006.01) | |
| *B01D 24/00* | (2006.01) | |

(52) U.S. Cl.
CPC ............ *B01D 24/001* (2013.01); *B01D 24/02* (2013.01); *B01D 24/14* (2013.01); *B01D 27/005* (2013.01); *B01D 27/02* (2013.01); *B01D 27/14* (2013.01); *B01D 29/0027* (2013.01); *B01D 29/0036* (2013.01); *B01D 29/0093* (2013.01); *B01D 29/01* (2013.01); *B01D 36/02* (2013.01); *B01D 2201/0415* (2013.01); *B01D 2201/347* (2013.01); *F25B 2400/16* (2013.01); *F25B 2400/162* (2013.01); *Y10T 29/49394* (2015.01)

(58) Field of Classification Search
CPC ...... B01D 27/14; B01D 24/042; B01D 24/10; B01D 29/0027; B01D 36/02; B01D 2201/0415; B01D 2201/347; B01D 15/00; B01D 24/001; B01D 27/005; B01D 29/0036; B01D 29/0093; B01D 29/01
USPC ....... 210/266, 282, 289, 308, 435, 443, 451, 210/499; 62/475
See application file for complete search history.

(56) References Cited

U.S. PATENT DOCUMENTS

| | | | |
|---|---|---|---|
| 2003/0121278 A1* | 7/2003 | Ichimura | F25B 43/003 62/474 |
| 2005/0204770 A1* | 9/2005 | Bernini | F25B 43/003 62/474 |
| 2006/0065601 A1* | 3/2006 | Baird | B01D 61/025 210/652 |

FOREIGN PATENT DOCUMENTS

| | | |
|---|---|---|
| CN | 101839594 A | 9/2010 |
| CN | 101839595 A | 9/2010 |
| CN | 201852383 U | 6/2011 |
| CN | 102175067 A | 9/2011 |
| CN | 102538323 A | 7/2012 |
| FR | 2872261 A1 | 12/2005 |
| JP | 8029021 A | 2/1996 |
| JP | 11182987 A | 7/1999 |
| JP | 2001221542 A | 8/2001 |
| JP | 2002130873 A | 5/2002 |
| JP | 2004211921 A | 7/2004 |
| JP | 2007113875 A | 5/2007 |
| JP | 2011080620 A | 4/2011 |

OTHER PUBLICATIONS

Extended European Search Report for corresponding European Patent Application No. 13 75 5273 dated Jul. 3, 2015.

* cited by examiner

US 9,759,463 B2

RECEIVER DRYER, METHOD OF MANUFACTURING RECEIVER DRYER AND AIR-CONDITIONING SYSTEM

This application is the national phase of International Application No. PCT/CN2013/071323, titled "LIQUID STORAGE DEVICE, METHOD OF MANUFACTURING LIQUID STORAGE DEVICE AND AIR-CONDITIONING REFRIGERATION SYSTEM", filed on Feb. 4, 2013, which claims the benefit of priority to Chinese Patent Application No. 201210046481.0 titled "AIR-CONDITIONING REFRIGERATION SYSTEM AND RECEIVER DRYER THEREOF", filed with the Chinese State Intellectual Property Office on Feb. 27, 2012, entire disclosures of both applications are incorporated herein by reference.

TECHNICAL FIELD

The present disclosure relates to the technical field of refrigeration systems, and particularly to a receiver dryer having low flow resistance. The present disclosure further relates to an air-conditioning system having the receiver dryer.

BACKGROUND

A receiver dryer, as an important component in a refrigeration system, functions to filter impurities in refrigerant, dry refrigerant, and store a certain amount of refrigerant, therefore it is widely used in refrigeration systems, for example, in an automobile air conditioner. Currently, there are many types of receiver dryers for automobile air conditioners, in which the receiver dryer having an upper body and a lower body is widely used.

Reference is made to FIG. 1, which is a schematic view of a relevant receiver dryer.

As shown in FIG. 1, the receiver dryer is of an elongated shape and formed by welding an upper body 1 and a lower body 2 together after the two bodies are butt-jointed. A desiccant bag 11 is accommodated in the upper body 1, and a molecular sieve 111 is received inside the desiccant bag 11. A refrigerant inlet 21 and a refrigerant outlet 27 are defined at a lower end of the lower body 2, and each of an upper end of the refrigerant inlet 21 and an upper end of the refrigerant outlet 27 is provided with a retaining screen 23 made of aluminum. A bottom surface of the retaining screen 23 has a plurality of small holes, and is spot-welded with a concave first metal screen 22. The first metal screen 22 is arranged to face the refrigerant inlet 21. A non-woven fabric filter 25 and a second metal screen 26 are provided between the retaining screen 23 and the refrigerant outlet 27 sequentially. An upper end of the retaining screen 23 is fixed by a protrusion 24, and the protrusion 24 is formed by punching an outside of the lower body 2.

Refrigerant enters via the refrigerant inlet 21, and then flows into the receiver dryer after being filtered by the first metal screen 22. Next, the refrigerant enters the upper body 1, and then passes through the desiccant bag 11 having the molecular sieve 111. The molecular sieve 111 can dry the refrigerant, thereby preventing an ice plug phenomenon from being caused when the refrigerant having excessive water passes through a throttle valve. Then, the refrigerant passes through the small holes on the retaining screen 23, and flows out of the receiver dryer via the refrigerant outlet 27 after being filtered by the non-woven fabric filter 25 and the second metal screen 26, in this way, impurities with certain sizes in the refrigerant are left in the receiver dryer, thereby achieving the predefined function of the receiver dryer.

In the receiver dryer, an effective filter area of the non-woven fabric filter 25 is an area thereof corresponding to the refrigerant outlet 27. In order to ensure a filter precision thereof, the non-woven fabric filter 25 is generally required to have a high compactness. As discovered by the inventor, in a case having the same filter area, the flow resistance of the non-woven fabric filter 25 increases as the compactness thereof increases, which may increase the load of the refrigeration system. On the other hand, since the non-woven fabric filter 25 has a high flow resistant, the impurities in the refrigerant are prone to be deposited on the surface of the non-woven fabric filter 25, which weakens the flow capacity of the non-woven fabric filter 25 and further increases its flow resistant, thereby resulting in a vicious circle and significantly affecting the performance of the refrigeration system.

In view of this, a technical problem to be solved presently by those skilled in the art is to improve the structure of the receiver dryer to reduce the flow resistance thereof while maintaining the filter precision thereof.

SUMMARY

An object of the present disclosure is to provide a receiver dryer, which may reduce its flow resistance while maintaining its filter precision. Another object of the present disclosure is to provide an air-conditioning system having the receiver dryer.

To achieve the first object, the present disclosure provides the following technical solutions.

A receiver dryer includes a second body, the second body having a first connecting port and a second connecting port, wherein the receiver dryer further includes a filter cartridge fitting with an inner wall of the second body to form a passage, the filter cartridge includes a filter part having filter capability, a first mating portion and a second mating portion, and the first mating portion and the second mating portion are arranged at two ends of the filter cartridge, respectively, the space between the filter part and the inner wall of the second body is in communication with the first connecting port, an inside of the filter part is in communication with the second connecting port via the second mating portion, and the refrigerant is filtered at least once during a process of flowing from the first connecting port to the second connecting port A receiver dryer includes a first body and a second body, one end of the second body facing the first body forming an open structure, and another end of the second body away from the first body defining a first connecting port and a second connecting port, wherein the receiver dryer includes a filter cartridge, the filter cartridge includes a first mating portion, a second mating portion, and a filter part at a middle portion thereof; the first mating portion fits with an inner wall of the second body, one space allowing refrigerant to flow is formed between the filter part and the inner wall of the second body, another space allowing refrigerant to flow is formed between the second mating portion and a portion of the second body where the first connecting port is arranged, the second mating portion fits with an inner wall of the second connecting port, the space between the filter part and the inner wall of the second body is in communication with the first connecting port, an inside of the filter part is in communication with the second connecting port via the second mating portion, and the refrigerant is filtered at least once during a process of flowing between the first connecting port and the second connecting port.

At least a part of the second mating portion is of a tubular shape and extends into the second connecting port, and an outer surface of the second mating portion is provided with an annular sealing protrusion at the part fitting with an inner wall of the second connecting port, and the annular sealing protrusion closely fits with the inner wall of the second connecting port, to prevent the refrigerant from passing through a space between an outer portion of the second mating portion and the second connecting port.

At least a part of an outer wall of the first mating portion is in close fit with the inner wall of the second body, or the outer wall of the first mating portion is in close fit with the inner wall of the second body via an annular sealing member.

The second body includes a first inner wall part fitting with the first mating portion of the filter cartridge and a second inner wall part close to the first body, an inner diameter of the first inner wall part is smaller than an inner diameter of the second inner wall part, a smooth transition is formed between the first inner wall part and the second inner wall part, and the outer wall of the first mating portion is in an annular close fit with the first inner wall part, to prevent the refrigerant from passing through a space between the outer wall of the first mating portion and the inner wall of the second body.

The outer wall of the first mating portion is not entirely in an interference fit with the inner wall of the second body, and the first mating portion is provided with a plurality of positioning flanges in a circumferential direction thereof, the filter cartridge is fixed by an interference fit formed between the positioning flanges and the inner wall of the second body, and a clearance is provided between other portions of the outer wall of the first mating portion and the inner wall of the second body, a filter cap is fixedly provided on the first mating portion of the receiver dryer, and the filter cap has a base body and a screen fixed by the base body.

The second mating portion is also provided with a plurality of positioning flanges in a circumferential direction, and a space or a clearance allowing the refrigerant to flow is provided between other portions of an outer wall of the second mating portion and the inner wall of the second body; and a space allowing the refrigerant to flow is provided between the second mating portion and a portion of the second body where the first connecting port is arranged.

A clearance is provided between the first mating portion of the filter cartridge and the inner wall of the second body, an elastic sealing member is provided between the first mating portion of the filter cartridge and the inner wall of the second body, the first mating portion is provided with a groove for accommodating the sealing member, and an annular elastic sealing member is provided in the groove to form a sealing between the first mating portion and the inner wall of the second body, thereby preventing the refrigerant from passing through a space between the outer wall of the first mating portion and the inner wall of the second body.

The filter part of the filter cartridge includes a bracket and a screen fixedly provided on the bracket, the bracket includes a first rib arranged in an axial direction thereof and a second rib arranged in a circumferential direction thereof, and the screen is fixed by the first rib and/or the second rib.

The screen of the filter part is a nylon screen, the bracket is made of thermoplastic material, and the screen and the bracket are integrated by injection molding.

The filter cartridge is made by injection molding of thermoplastic material, and the screen is fixed by plastic; the first mating portion is provided with at least one annular sealing sheet protruding outwards from a base body thereof, the annular sealing sheet is formed integrally with the filter cartridge by injection molding, and the first mating portion is further provided with a positioning portion; the annular sealing sheet is larger than other portions of the first mating portion, and the annular sealing sheet is in contact with the inner wall of the second body.

The second mating portion and the first mating portion of the filter cartridge are made of thermoplastic material and are formed integrally with the filter part by injection molding, and the nylon screen is fixed by injection molding as an insert in the injection molding.

The second mating portion is also fixedly provided with a screen, and the refrigerant is filtered by the filter part or the second mating portion when flowing between the first connecting port and the second connecting port.

The first body has a barrel-shaped structure with an opening facing the second body, a desiccant bag is provided in a cavity formed by the first body and the second body, and the desiccant bag has a molecular sieve received therein, and a retaining member is provided between the filter cartridge and the desiccant bag, and the retaining member is fixed by the second body or the first mating portion of the filter cartridge; and the retaining member is provided with a plurality of through holes to ensure the flow of the refrigerant.

The retaining member is axially limited by a positioning protruding portion arranged on the second body, and after the filter cartridge is mounted into the second body and the retaining member is mounted in place, the outer wall of the second body is pressed or punched to protrude inwards to form the positioning protruding portion, so as to limit the position of the retaining member.

The retaining member is a metal retaining screen fixed in the first mating portion, and the metal retaining screen is provided with a plurality of through holes; the filter cartridge is fixed to the second body via a positioning protruding portion, and after the filter cartridge is mounted into the second body, the outer wall of the second body is pressed or punched to protrude inwards to form the positioning protruding portion.

The filter part of the filter cartridge includes a bracket and a screen fixedly provided on the bracket, the bracket includes a first rib arranged in an axial direction thereof and a second rib arranged in a circumferential direction thereof, and the screen is fixed by the first rib and/or the second rib; and the screen of the filter part is a nylon screen, the bracket is made of a thermoplastic material, and the screen and the bracket are integrated by injection molding.

A method for manufacturing a receiver dryer is further provided according to the present disclosure, wherein the receiver dryer includes a first body and a second body, one end of the second body facing the first body has an open structure, and another end of the second body away from the first body has a first connecting port and a second connecting port, the receiver dryer includes a filter cartridge, the filter cartridge includes a first mating portion, a second mating portion, and a filter part at a middle portion thereof; the first mating portion fits with an inner wall of the second body, and a space allowing refrigerant to flow is provided between the filter part and the inner wall of the second body, the second mating portion fits with the inner wall of the second connecting port, the space between the filter part and the inner wall of the second body is in communication with the first connecting port, an inside of the filter part is in communication with the second connecting port via the second mating portion, and the refrigerant is filtered at least once during a process of flowing between the first connecting port and the second connecting port, and the method for manufacturing the receiver dryer includes the following manufacturing steps:

machining and shaping the first body and the second body;

assembling the filter cartridge, wherein the assembling the filter cartridge includes cutting a screen into a predetermined size and rolling the screen to form a barrel shape, and then placing the rolled and fixed screen on an injection mold and performing injection molding to obtain the filter cartridge;

mounting the filter cartridge into the second body;

pressing or punching the outer wall of the second body to make the outer wall of the second body protrude inwards to form the positioning protruding portion; and assembling the first body with the second body which has been assembled, and welding the first body with the second body after the two bodies are butted or one body is inserted into another body, to hermetically fix the first body and the second body.

An air-conditioning system is further provided according to the present disclosure, which includes a compressor, a heat exchanger and a receiver dryer connected to the compressor or the heat exchanger, wherein the receiver dryer has the same structure as described herein above.

Based on the above description, compared with the receiver dryer in the background, the receiver dryer according to the present disclosure modifies the filtering member for the refrigerant by replacing the non-woven fabric filter with the filter part of the filter cartridge, and thus the refrigerant is filtered at least once during a process of flowing from the first connecting port to the second connecting port or flowing in the reverse direction. The filter part is in a cylindrical surface structure, which has an effective filter area for the refrigerant larger than the effective filter area of the refrigerant outlet in the background, thus the filter area of the filter part for most of the refrigerant is increased, thereby avoiding the drawback of a large flow resistance caused by using the non-woven fabric filter having an over-high compactness, and at the same time, maintaining the filter precision of the receiver dryer. On the other hand, since the flow resistance of the receiver dryer is reduced, the impurities in the refrigerant are not prone to deposit on the surface of the filter cartridge, thus the impurities has a less influence on the flow capability of the filter cartridge, which ensures the operation performance of the refrigeration system.

An air-conditioning system according to the present disclosure includes a compressor, a heat exchanger and a receiver dryer connected to the compressor or the heat exchanger, and the receiver dryer is any one of the above receiver dryers. Since the receiver dryer has the above technical effects, the air-conditioning system having the receiver dryer also has the corresponding effects.

BRIEF DESCRIPTION OF THE DRAWINGS

In order to more clearly illustrate the technical solution of the present disclosure, drawings in the description will be briefly described hereinafter. Apparently, the drawings in the following description are only a few of embodiments of the present disclosure, and for the person skilled in the field, other drawings may be obtained based on these drawings without any creative efforts.

Figure 1:
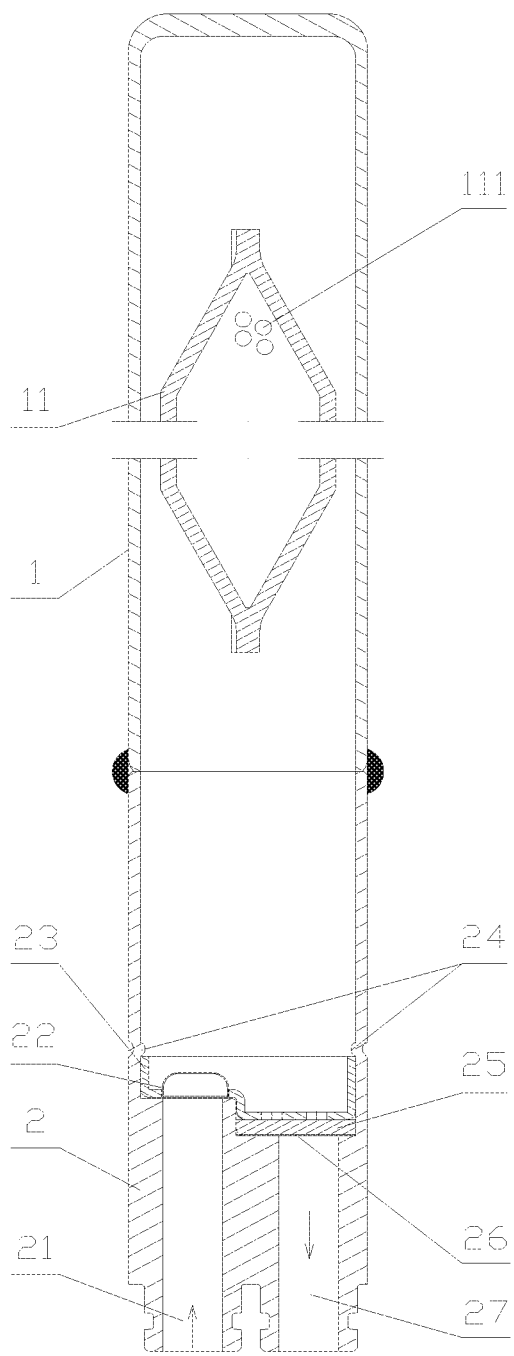
FIG. 1 is a schematic view of a relevant receiver dryer.

| Reference Numerals in the Figures: | | | |
|---|---|---|---|
| 1 | upper body; | 11 | desiccant bag; |
| 111 | molecular sieve; | 2 | lower body; |
| 21 | refrigerant inlet; | 22 | first metal screen; |
| 23 | retaining member; | 24 | protrusion; |
| 25 | non-woven fabric filter; | 26 | second metal screen; |
| 27 | refrigerant outlet; | 3 | second body; |
| 31 | first connecting port; | 32 | second connecting port; |
| 33 | filter cartridge; | 331 | filter part; |
| 332 | first mating portion; | 333 | second mating portion; |
| 334 | positioning flange; | 335 | inclined surface; |
| 336 | annular sealing protrusion; | 34 | positioning protruding portion; |
| 35 | retaining member; | 36 | first inner wall part; |
| 37 | second inner wall part; | 38 | filter cap; |
| 381 | base body; | 382 | screen; |
| 39 | O-ring; | 4 | first body; |
| 41 | desiccant bag; and | 411 | molecular sieve. |

DETAILED DESCRIPTION

A receiver dryer is provided which may reduce its flow resistance while maintaining its filter precision. An air-conditioning system having the receiver dryer is further provided.

For those skilled in the field to better understand technical solutions of the present disclosure, the present disclosure is described in detail in conjunction with drawings and embodiments hereinafter.

Referring to FIGS. 2 to 8, a receiver dryer includes a first body 4, a second body 3, and a filter cartridge 33. The first body 4 is in a barrel-shaped structure. An end of the second body 3 facing the first body is in an open structure, and after the filter cartridge 33 is mounted into the second body 3 via the open end of the second body 3 facing the first body, the second body 3 and the first body 4 are welded together after the two bodies are butt-jointed or one body is inserted into another body. In addition, the second body 3 and the first body 4 may be fixed hermetically by other manners, such as a threaded connection, or a combination of a threaded connection and a sealing member. Another end of the second body 3 away from the first body 4 is provided with a first connecting port 31 and a second connecting port 32. The receiver dryer is provided with a desiccant bag 41 in a cavity formed by the first body 4 and the second body 3, and a molecular sieve 411 is received in the desiccant bag 41. An upper end of the filter cartridge 33 has a positioning flange 334 which is in an interference fit with an inner wall of the second body 3. A lower end of the filter cartridge 33 has an inclined surface 335, and a passage is formed between the inclined surface 335 and the inner wall of the second body 3. The passage communicates with an upper space of the filter cartridge 33 via a space between an outer wall of the filter cartridge 33 and the inner wall of the second body 3. Further, instead of being provided with the inclined surface, the filter cartridge 33 can also form the passage by other manners, for example, forming a stepped portion or an arc surface. The filter cartridge 33 includes a filter part 331, a first mating portion 332 close to the first body, and a second mating portion 333 away from the first body. The first mating portion 332 and the second mating portion 333 may be made of a material different from that of the filter part 331 and are connected to two ends of the filter part 331 respectively, and the two mating portions are in communication with each other. After the filter cartridge 33 is mounted into the second body 3, the passage is directly communicated with the first connecting port 31, and the second mating portion 333 is directly communicated with the second connecting port 32, that is, an outside of the filter part 331 is in communication with the first connecting port 31, and an inside of the filter part 331 is in communication with the second connecting port 32 via the second mating portion 333.

The outer wall of the first mating portion 332 of the filter cartridge 33 may also be in an interference fit with the second body 3. After entering the passage via the first connecting port 31, the refrigerant can enter the filter cartridge 33 only through the filter part 33, and then flow to the second connecting port 32 via the second mating portion 333, in this way, the refrigerant will be filtered. A part of the refrigerant will further enter the first body 4, and the molecular sieve 411 in the desiccant bag 41 may dry the refrigerant, thereby avoiding the ice plug phenomenon caused when the refrigerant having excessive water passes the filter valve. Thus, the refrigerant may flow out of the receiver dryer via the second connecting port 32. With the aforementioned structure, the receiver dryer may ensure that the refrigerant will be filtered at least once in the process of flowing from the first connecting port 31 to the second connecting port 32, thus the impurities in the refrigerant may be left in the receiver dryer, thereby achieving the purpose of filtering the refrigerant, and further, the filter part has a relatively large filtering area, and thus having a low resistance.

Based on the above description, the receiver dryer modifies the filtering member of the refrigerant by replacing the non-woven fabric filter with the filter part 331 of the filter cartridge 33, and the filter part 331 is in a cylindrical surface structure, which has an effective filter area for the refrigerant larger than the effective filter area of the refrigerant outlet in the background, thus the filter area of the filter part for most of the refrigerant is increased, so that a large flow resistance caused by using the non-woven fabric filter having an over-high compactness is avoided, and at the same time, the filter precision of the receiver dryer is maintained. On the other hand, since the flow resistance of the receiver dryer is reduced, the impurities in the refrigerant are not prone to deposit on the surface of the filter cartridge 33, thus the impurities has less influence on the flow capability of the filter cartridge 33, which further ensures the operation performance of the refrigeration system.

In actual production or use processes, the flow direction of the refrigerant may be reverse to that of the above process, that is, the refrigerant may enter the second connecting port 32, and flow into the filter cartridge 33 via the second mating portion 333; and after being filtered by the filter cartridge 33, the refrigerant may pass through the space between the outside of the filter cartridge 33 and the inner wall of the second body 3, pass through the passage, and then flow out via the first connecting port 31, that is, the refrigerant may first flow into the filter cartridge 33, then flow into the passage after being filtered by the filter part 331, and flow out of the receiver dryer via the first connecting port 31. The filter part 331 includes a bracket 3310 and a screen 3311 fixedly arranged on the bracket 3310, and the bracket includes a first rib arranged in an axial direction thereof and a second rib arranged in a circumferential direction thereof. The screen is fixed by the first rib or the second rib, or is fixed by both the first rib and the second rib. The bracket 3310 may be made of plastic and formed by injection molding, and the screen 3311 may be fixed to the bracket 3310 as an insert in the injection molding process to be formed integrally with the bracket 3310. The second mating portion 333 and the first mating portion 332 may also be formed with the bracket 3310 integrally by injection molding, so that the receiver dryer has fewer components and is assembled more easily.

Figure 2:
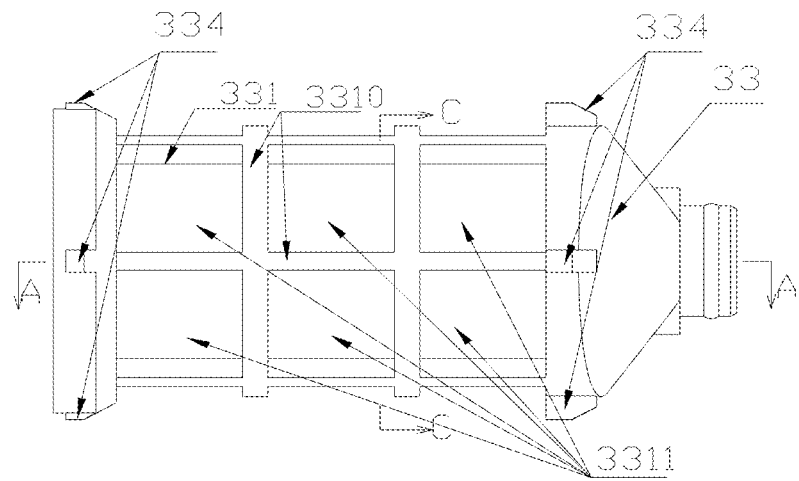
FIG. 2 is a schematic view of a filter cartridge according to a first embodiment of the present disclosure.
Figure 3:
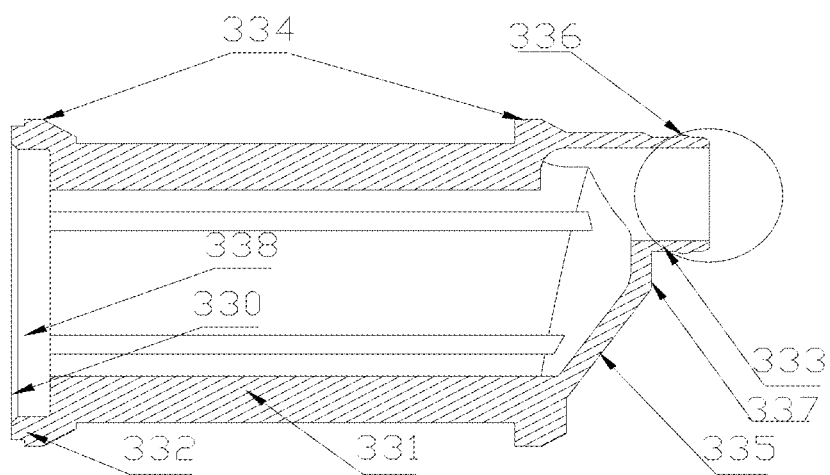
FIG. 3 is a structural schematic view taken along the line A-A of FIG. 2.
Figure 4:
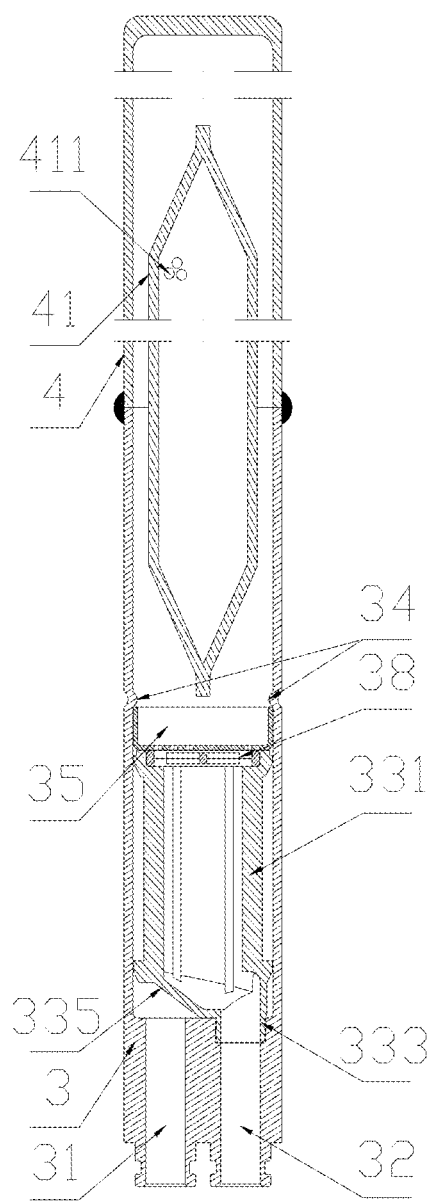
FIG. 4 is a schematic view of a receiver dryer according to the first embodiment of the present disclosure.

Furthermore, the outer wall of the first mating portion 332 of the filter cartridge 33 may be not entirely in an interference fit with the inner wall of the second body 3. The first mating portion 332 and the lower end of the filter cartridge 33 may both be provided with positioning flanges 334 which are disposed in the axial direction and the circumferential direction of the filter cartridge 33. The positioning flanges 334 are in an interference fit with the inner wall of the second body 3 to fix the filter cartridge 33, and a gap or a space is provided between other portions of the outer wall of the first mating portion 332 and the inner wall of the second body 3. Compared with the manner that the filter cartridge 33 is in a direct interference fit with the second body 3, the contact area between the positioning flanges 334 and the inner wall of the second body 3 is significantly decreased in the above connection manner, which reduces the friction between the filter cartridge 33 and the second body 3, and further reduces the wear of parts during the assembly of the receiver dryer, so that the life of the receiver dryer is lengthened. In the practical production, there are eight positioning flanges 334 symmetrically disposed as shown in FIGS. 2 and 3, and the upper end and the lower end of the filter cartridge 33 are both provided with four positioning flanges 334 uniformly disposed. In addition, there may also be six positioning flanges 334, and the upper end and the lower end of the filter cartridge 33 are both provided with three positioning flanges 334 uniformly disposed.

In addition, in the above technical solution, the connection between the filter cartridge 33 and the second body 3 may be a clearance fit instead of the interference fit. The positioning flanges 334 may be fit with a small clearance in the second body 3. The filter cartridge 33 is fixed by a positioning protruding portion 34 formed on the inner wall of the second body 3, and the second mating portion 333 is hermetically connected to the second connecting port 32 of the second body 3. In addition, in order to ensure that the refrigerant will be filtered at least once in the process of flowing from the first connecting port 31 to the second connecting port 32 or in the process of flowing in the reverse direction, the receiver dryer in this embodiment may be further provided with a filter cap 38 which is in an interference fit with the first mating portion 332 to be fixed. The filter cap 38 is fixed by forming an interference fit with an open end 338 of the first mating portion 332, and may also be fixed by other ways, such as a press-fit. After the filter cap 38 is mounted in the open end 338 of the first mating portion 332, the filter cap 38 is flush with or slightly lower than an end surface 330 of the open end 338 of the first mating portion 332. In this way, even if a part of the refrigerant enters the first body 4 through the gap between the filter cartridge 33 and the second body 3 after passing through the first connecting port 31, this part of the refrigerant still need to flow through the filter cap 38 on the first mating portion 332 so as to flow out of the receiver dryer, thus, the leakage of the impurities in the refrigerant may be avoided, and this part of the refrigerant is filtered. The filter cap 38 may be a filter plate having a simple structure, and a screen is fixed in the filter plate.

Figure 5:
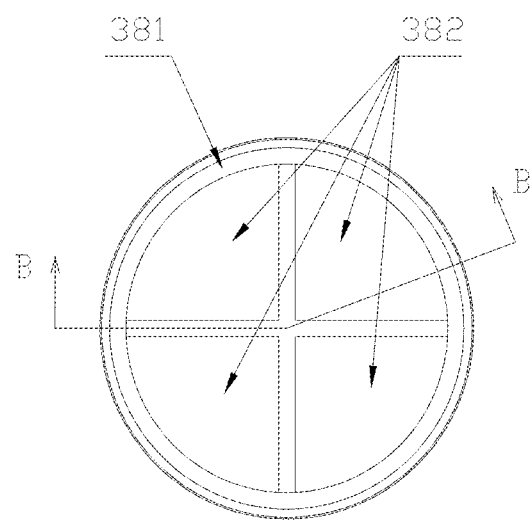
FIG. 5 is a schematic view of a filter cap according to the embodiment of the present disclosure.
Figure 6:
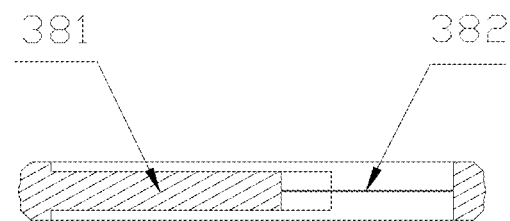
FIG. 6 is a schematic view of the filter cap taken along line B-B of FIG. 5.
Figure 7:
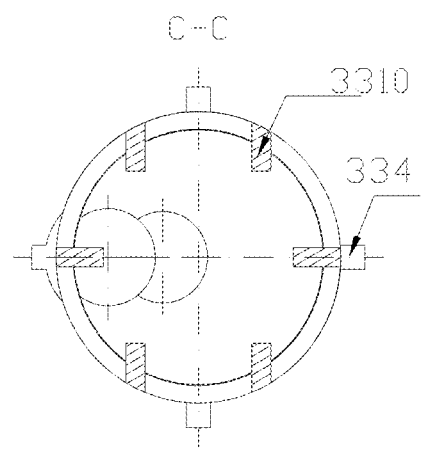
FIG. 7 is a schematic view of the filter cartridge taken along line C-C of FIG. 2.
Figure 8:
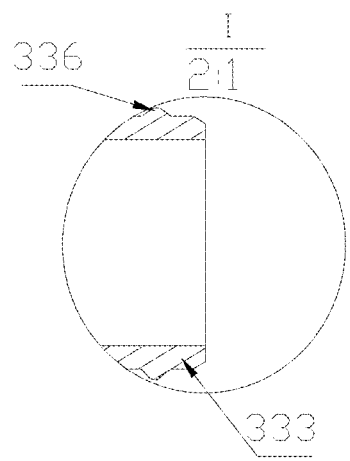
FIG. 8 is a partially enlarged schematic view of the filter cartridge shown in FIG. 3.

The filter cap may be a structure as shown in FIG. 5 and FIG. 6. FIG. 5 is a schematic view of the filter cap according to the embodiment of the present disclosure. FIG. 6 is a schematic view of the filter cap taken along the line B-B of FIG. 5. The filter cap 38 includes a metal base body 381 and a metal screen 382 embedded in the base body 381.

Compared with the filter plate, the filter cap 38 with this structure may fix the screen 382 by the base body 381, which significantly improves the strength of the connection between the filter cap 38 and the filter cartridge 33. In addition, the base body 381 may also be a plastic base body, the screen 382 may be a nylon screen, and the base body 381 and the screen 382 are formed integrally by injection molding. In this case, the screen 382 of the filter cap 38 has a high compactness, thereby improving the filter capacity of the receiver dryer.

The aforementioned structure may not only ensure the filter function of the receiver dryer to be successfully achieved, but also reduce wear of the filter cartridge 33 and the second body 3 during the assembling process. The positioning flanges 334 may not only guide the filter cartridge 33 during the assembling process, but also prevent the filter cartridge 33 from being assembled irregularly when the filter cartridge 33 is tilted excessively in the second body 3, thereby ensuring the working reliability of the filter cartridge 33. Thus, it may ensure that the refrigerant will be filtered at least once when flowing from the first connecting port 31 to the second connecting port 32 or flowing in the reverse direction, and the friction is relatively low in the assembling process.

In addition, a retaining member 35 may be further provided between the filter cartridge 33 and the desiccant bag 41. The retaining member 35 is limited axially by the positioning protruding portion 34 to prevent an inclination or axial movement of the filter cartridge 33 in transport or vibration. In the assembling process, after the filter cartridge 33 is assembled, the retaining member 35 is mounted, and then the outer wall of the second body may be pressed or punched to protrude inward to form the position protruding portion 34. The retaining member 35 is provided with a plurality of through holes to ensure the normal flow of the refrigerant; and the filter cartridge 33 is fixed by the retaining member 35, which may avoid the deformation of the filter cartridge 33 caused in a case that the filter cartridge 33 is subjected to a force when being directly connected to the positioning protruding portion 34. Further, it can completely avoid the possibility of the desiccant bag 41 falling into the filter cartridge or abutting the filter cap, thereby ensuring the normal filter capacity. The retaining member 35 is a metal retaining member preferably. Apparently, the retaining member 35 may prolong the life of the receiver dryer.

Figure 9:
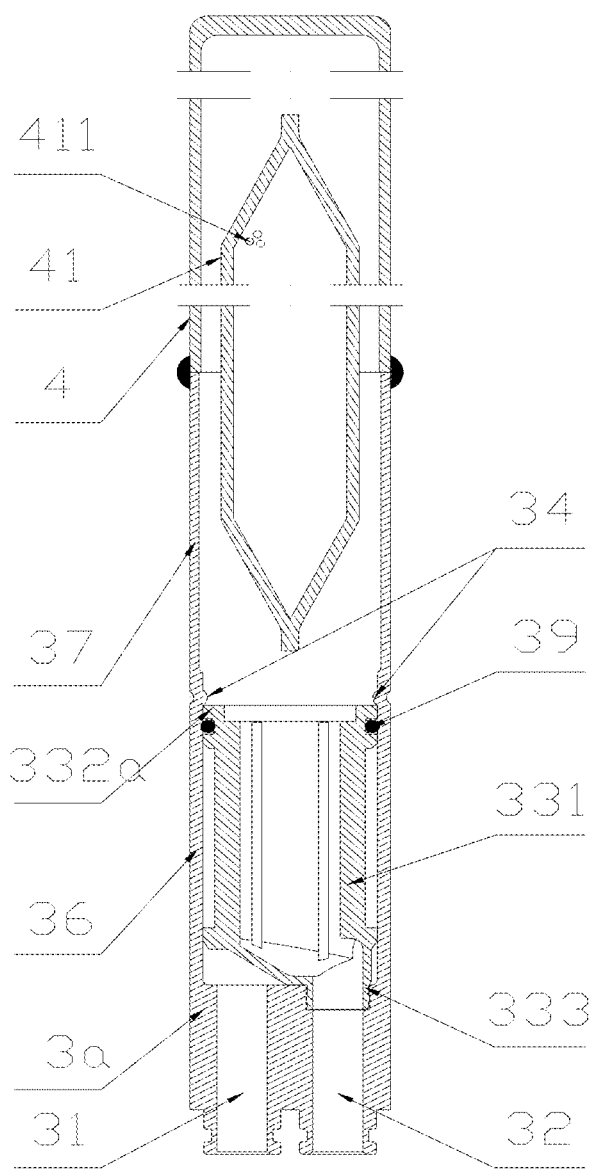
FIG. 9 is a schematic view of a receiver dryer according to a second embodiment of the present disclosure.
Figure 11:
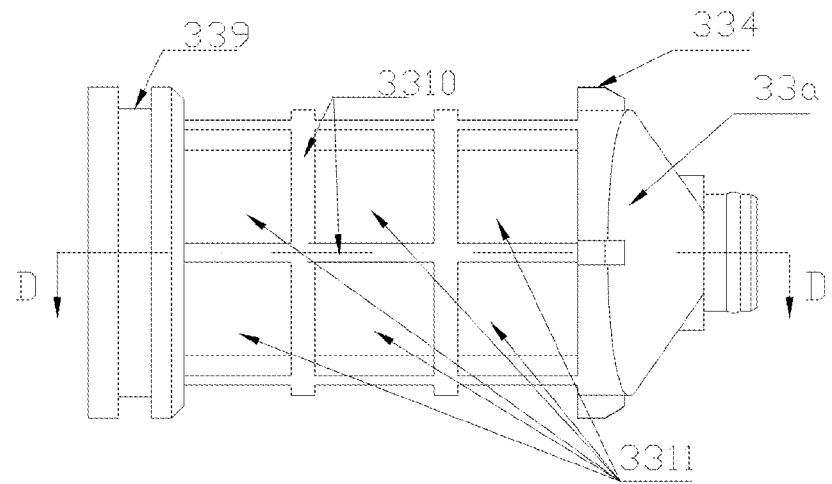
FIG. 11 is a schematic view of a filter cartridge of the receiver dryers shown in FIGS. 9 and 10.
Figure 12:
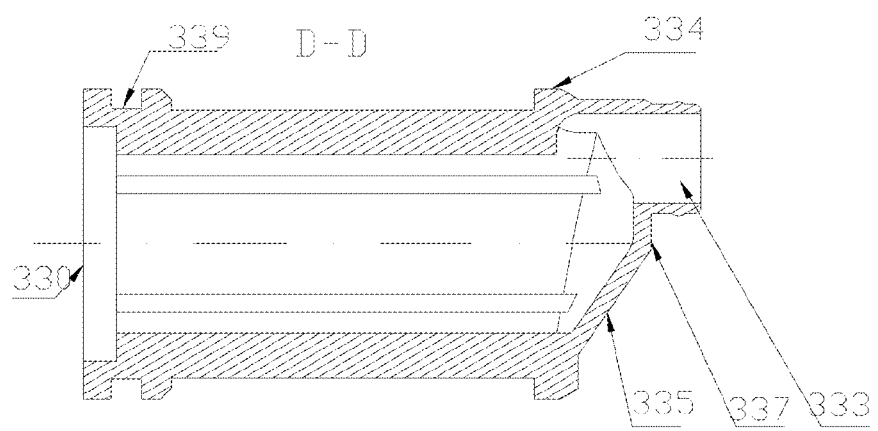
FIG. 12 is a schematic view of the filter cartridge taken along line D-D of FIG. 11.

Another embodiment is introduced as follows. Reference is made to FIGS. 9, 11 and 12, which are schematic views of a receiver dryer according to a second embodiment of the present disclosure. In this embodiment, a sealing member is further provided between a first mating portion 332a of a filter cartridge 33a and an inner wall of a second body 3a. The first mating portion 332a is provided with a groove 339 for accommodating the sealing member, and an O-ring 39 is arranged in the groove 339 as the sealing member, thereby forming a good sealing between the first mating portion 332a and the inner wall of the second body 3a. In this way, after flowing into the passage, the refrigerant can flow into the filter cartridge 33 only via the filter part 331, or when flowing in a reverse direction, the refrigerant can flow into the passage only via the filter part 331, so that the impurities in the refrigerant may effectively be filtered. Compared with the manner providing the filter cap 38, in this embodiment, the sealing member may ensure almost all the refrigerant to be directly filtered by the filter part 331, and the filter part 331 apparently has a larger area than the filter cap 38, so that no filter cap is required to be provided.

Based on the above solution, in order to simplify the assembly of the filter cartridge 33 and the sealing member, the inner wall of the second body 3a includes a first inner wall part 36 in contact with the sealing member and a second inner wall part 37 connected to an upper end of the first inner wall part 36, and an inner diameter of the first inner wall part 36 is smaller than an inner diameter of the second inner wall part 37. A smooth transition is formed between the first inner wall part 36 and the second inner wall part 37, to function as a guiding member for assembling, for example, a slope or an arc is provided to achieve the smooth transition guidance. In the assembling process, the sealing member is firstly mounted on the filter cartridge 33a, then the filter cartridge 33a mounted with the sealing member is mounted in the second inner wall part 37 having the larger inner diameter, and then the filter cartridge 33a mounted with the sealing member is further mounted to fit with the first inner wall part 36 having the smaller inner diameter so as to meet the requirement for compression of the sealing member, which may ensure a good sealing between the filter cartridge 33a and the second body 3a. Apparently, the sealing member will not be in contact with the second inner wall part 37 during the assembling process, the friction between the sealing member and the second body 3a is close to zero in a process of moving the sealing member close to the first inner wall part 36, and the sealing member only contacts the first inner wall part 36 when it is mounted into the first inner wall part 36, in this way, the wear of the sealing member is effectively reduced during the assembling process, and the life of the sealing member is ensured. That is to say, the second body 3a uses a structure with different wall thicknesses, which may be manufactured by cold extrusion or other machining methods.

Figure 10:
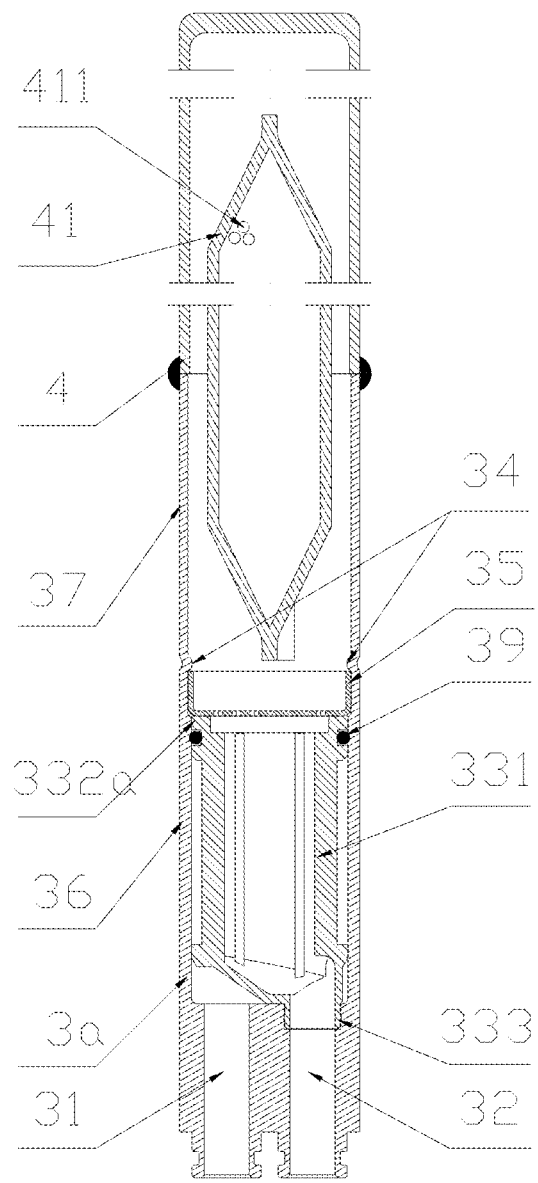
FIG. 10 is a schematic view of a receiver dryer according to a third embodiment of the present disclosure.

FIG. 10 is a schematic view of a receiver dryer according to a third embodiment of the present disclosure. A main difference between this embodiment and the second embodiment lies in that, in this embodiment, the receiver dryer further includes a retaining member 35 abutting against the filter cartridge. The retaining member 35 may be located at the second inner wall part 37, and be fixed or limited in the axial direction thereof by the positioning protruding portion 34. In addition, instead of abutting against each other, the retaining member 35 and the filter cartridge may be arranged with a clearance, thereby preventing the filter cartridge from moving towards the first body and preventing the desiccant bag 41 from further moving towards the filter cartridge. In the above solution, the retaining member 35 arranged above the filter cartridge 33 can prevent the desiccant bag from falling into the filter cartridge and thereby prolonging the life of the receiver dryer. Similarly, a retaining member 35 with the same structure may be provided on the second inner wall part 37, and may also prolong the life of the receiver dryer.

In order to enlarge the filter area of the receiver dryer for the refrigerant, the second mating portion 333 and the filter part 331 may be formed integrally, and the second mating portion 333 is also made of filtering material. After being in contact with the filter cartridge 33, the refrigerant may flow in or out of the filter cartridge 33 through both the filter part 331 and a screen of the second mating portion 333. Apparently, the filter area of the filter cartridge 33 for the refrigerant is further increased, which reduces the flow resistance of the receiver dryer.

In the above technical solution, the second connecting port 32 may be in a stepped structure, and a part of the second mating portion 333 is in a tubular shape and extends into the second connecting port 32. The second mating portion 333 is provided with an annular sealing protrusion 336 at an outer surface of the tubular part fitting with the second connecting port 32. The annular sealing protrusion 336 may closely fit with the inner wall of the second connecting port 32, which ensures that the refrigerant cannot pass between the second mating portion 333 and the second connecting port 32. In addition, the annular sealing protrusion 336 can have certain elasticity, when mounting the filter cartridge 33, the annular sealing protrusion 336 is deformed by a force applied on the second mating portion 333, and the deformation may increase the friction between the second mating portion 333 and the inner wall of the second body and thereby ensuring a good sealing of the second mating portion 333. The annular sealing protrusion 336 may be arc-shaped, which may form more uniform friction. A stepped portion 337 may be provided at the second mating portion 333 of the filter cartridge to replace the slope, and function as an axially positioning part with respect to the second body, thereby ensuring the consistence of the assembly of the receiver dryer.

Figure 13:
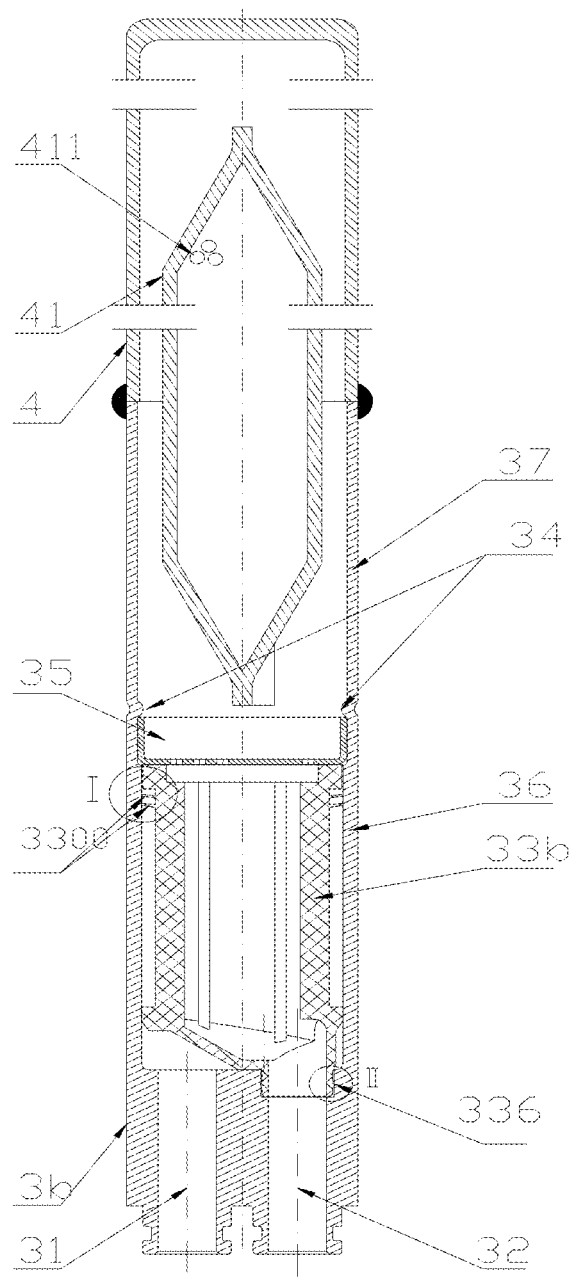
FIG. 13 is a structural schematic view of a receiver dryer according to a fourth embodiment of the present disclosure.
Figure 14:
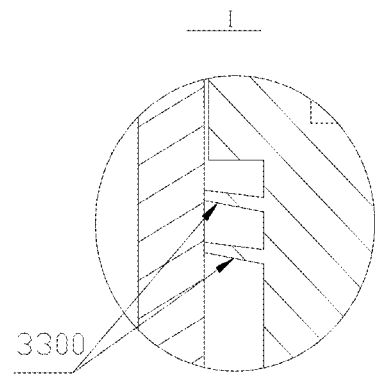
FIG. 14 is a partially enlarged view of part I of the receiver dryer shown in FIG. 13.
Figure 15:
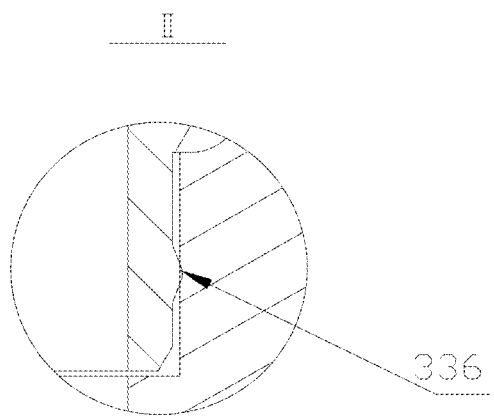
FIG. 15 is a partially enlarged view of part II of the receiver dryer shown in FIG. 13.
Figure 16:
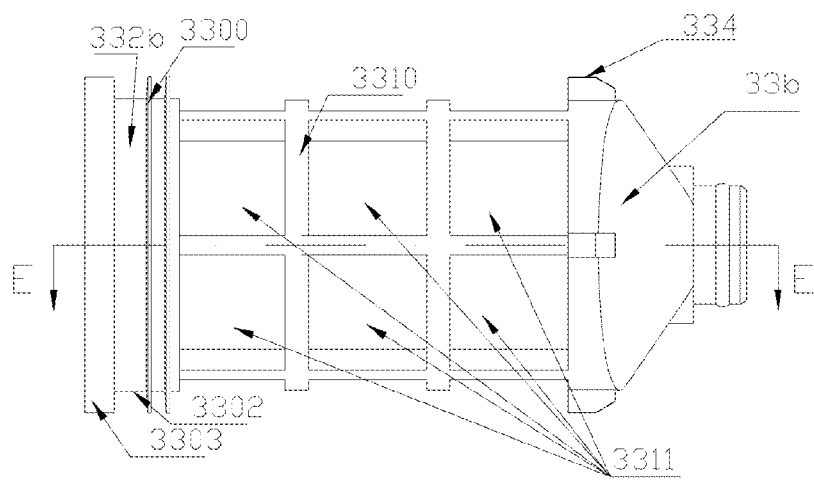
FIG. 16 is a schematic view of a filter cartridge of the receiver dryer shown in FIG. 13.
Figure 17:
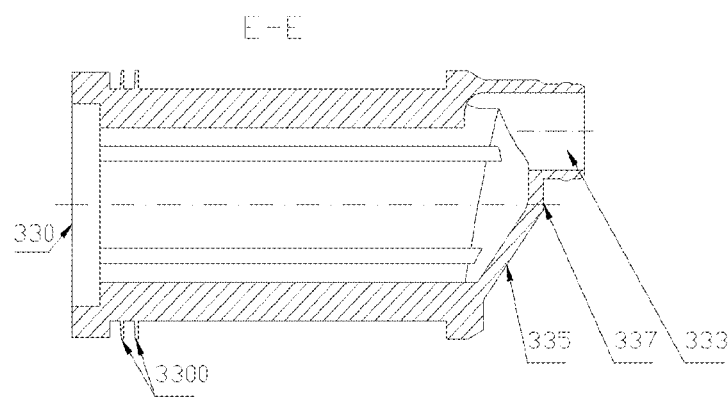
FIG. 17 is a structural schematic view of the filter cartridge taken along line E-E of FIG. 16.

A fourth embodiment is introduced as follows. As shown in FIGS. 13 to 17, a main difference between this embodiment and the above embodiment lies in the sealing structure between the filter cartridge and the second body. In this embodiment, a filter cartridge 33b is made by plastic injection molding, a first mating portion 332b is provided with an annular sealing sheet 3300 protruding outwards from a base portion 3302 thereof, and the annular sealing sheet 3300 and the filter cartridge 33b are integrally formed by injection molding. The first mating portion 332b is further provided with a positioning portion 3303, the positioning portion 3303 may be in an annular structure, and may also include a plurality of combined arcs to achieve positioning. The annular sealing sheet 3300 is larger than other portions of the first mating portion 332b, that is, the annular sealing sheet 3300 is larger than the positioning portion 3303. In the assembling process, the annular sealing sheet 3300 is deformed elastically when abutting against a first inner wall part 36 of a second body 3b, and thus the annular sealing sheet 3300 and the first inner wall part 36 of the second body 3 are closely fitted with each other to form a sealing. The assembled structure is shown in FIG. 13, in this way, the refrigerant has to flow into or out of the filter cartridge 33b through the filter part 331, and thus will be filtered by the screen 3311. The annular sealing sheet 3300 fits closely with the inner wall of the second body, and other portions of the filter cartridge 33b are in clearance fit with the inner wall of the first body 3b. In this way, the assembly is relatively convenient, and the frictional resistance is relatively low during the assembly; since the annular sealing sheet 3300 and the filter cartridge are formed integrally by injection molding, the number of parts to be assembled is reduced. Similarly, a retaining member 35 is provided between the filter cartridge 3b and the desiccant bag 41 in this embodiment, which has the same function as described above, and therefore does not need to be repeated here.

Figure 18:
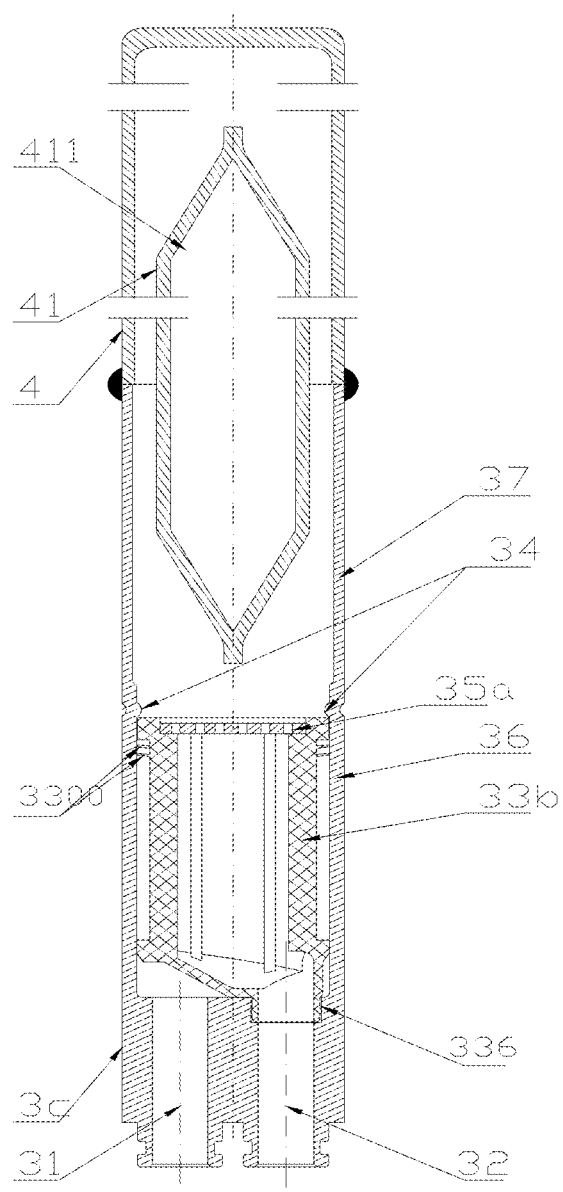
FIG. 18 is a schematic view of a receiver dryer according to a fifth embodiment of the present disclosure.

A fifth embodiment is introduced as follows. As shown in FIG. 18, a main difference between this embodiment and the fourth embodiment lies in that this embodiment does not include any retaining member. In this embodiment, the second body is formed with an indentation by punching or a rolling groove to fix the positioning portion 3303 of the filter cartridge 33b, thereby fixing the filter cartridge 33b. In addition, a metal retaining screen 35a is provided in the first mating portion 332b to prevent the desiccant bag 41 from falling into the filter cartridge 33b. The metal retaining screen 35b may be in close fit with an inner hole of the first mating portion 332b so as to be fixed. In this way, an axial length of the receiver dryer may be decreased.

In each of the above technical solutions, the material of the screen 3311 forming the filter part 331 may be metal filter medium such as a stainless steel screen mesh, or non-metal filter medium such as nylon. Compared with other filter materials, nylon as one kind of synthetic fiber has better filter performance and excellent properties, such as tensile strength, surface hardness, abrasive resistance, and chemical resistance, thus the screen 3311 made of nylon have a better overall performance.

In each of the above technical solutions, the positioning protruding portion 34 may be a plurality of scattered protrusions protruding inwards and formed by punching, or an annular protrusion protruding inwards and formed by groove rolling. The machines for punching and groove rolling are different, and apply different magnitudes of force on the filter cartridge 33 to form the positioning protruding portion 34. In machining, the manufacturing method of the positioning protruding portions 34 may be determined according to the operation performance of the receiver dryer, the manufacturing cost, and other requirements.

In each of the above technical solutions, the sealing member may be a packing or a sealing ring, such as an O-ring 39. The O-ring 39 is a common sealing member in the engineering equipment and has excellent elasticity. During the assembly of the filter cartridge 33, the O-ring 39 is pressed to generate an obvious deformation, and therefore, the O-ring 39 may apply a large elastic force on the inner wall of the second body, thereby achieving an excellent sealing.

An air-conditioning system according to the present disclosure includes a compressor and a receiver dryer connected to the compressor, and the receiver dryer is any one of the aforementioned receiver dryers. Since the receiver dryer has the above technical effects, the air-conditioning system having the receiver dryer also has corresponding technical effects, which will not be described herein.

The air-conditioning system and the receiver dryer thereof according to the present disclosure are described in detail hereinbefore. The principle and the embodiments of the present disclosure are illustrated herein by specific examples. The above description of examples is only intended to help the understanding of the method and the idea of the present disclosure. Terms indicating the directions and positions, such as "up" and "down", in the description are only used to facilitate describing and should not be interpreted as limitation to the present disclosure. It should be noted that, for the person skilled in the field, a few of modifications and improvements, including combinations or substitutions, may be made to the present disclosure without departing from the principle of the present disclosure, and these modifications and improvements are also deemed to belong to the scope of the present disclosure defined by the claims.

The invention claimed is:

1. A receiver dryer, comprising a first body and a second body, one end of the second body facing the first body forming an open structure, and another end of the second body away from the first body defining a first connecting port and a second connecting port, wherein, the receiver dryer further comprises a filter cartridge, the filter cartridge comprises a first mating portion, a second mating portion, and a filter part at a middle portion thereof; the first mating portion fits with an inner wall of the second body, one space allowing refrigerant to flow is formed between the filter part and the inner wall of the second body, another space allowing refrigerant to flow is formed between the second mating portion and a portion of the second body where the first connecting port is arranged, the second mating portion fits with an inner wall of the second connecting port, the space between the filter part and the inner wall of the second body is in communication with the first connecting port, an inside of the filter part is in communication with the second connecting port via the second mating portion, and the refrigerant is filtered at least once during a process of flowing between the first connecting port and the second connecting port; and wherein, the first body has a barrel-shaped structure with an opening facing the second body, a desiccant bag is provided in a cavity formed by the first body and the second body, and the desiccant bag has a molecular sieve received therein; a retaining member is provided between the filter cartridge and the desiccant bag, and the retaining member is fixed by the second body or the first mating portion of the filter cartridge; and the retaining member is provided with a plurality of through holes to ensure the flow of the refrigerant.

2. The receiver dryer according to claim 1, wherein, at least a part of the second mating portion is of a tubular shape and extends into the second connecting port, and an outer surface of the second mating portion is provided with an annular sealing protrusion at the part fitting with an inner wall of the second connecting port, and the annular sealing protrusion closely fits with the inner wall of the second connecting port to prevent the refrigerant from passing through a space between an outer portion of the second mating portion and the second connecting port.

3. The receiver dryer according to claim 2, wherein, the filter part of the filter cartridge comprises a bracket and a screen fixedly provided on the bracket, the bracket comprises a first rib arranged in an axial direction thereof and a second rib arranged in a circumferential direction thereof, and the screen is fixed by the first rib and/or the second rib; and the screen of the filter part is a nylon screen, the bracket is made of a thermoplastic material, and the screen and the bracket are integrated by injection molding.

4. The receiver dryer according to claim 1, wherein, at least a part of an outer wall of the first mating portion is in close fit with the inner wall of the second body, or the outer wall of the first mating portion is in close fit with the inner wall of the second body via an annular sealing member.

5. The receiver dryer according to claim 4, wherein, the second body comprises a first inner wall part fitting with the first mating portion of the filter cartridge and a second inner wall part close to the first body, an inner diameter of the first inner wall part is smaller than an inner diameter of the second inner wall part, a smooth transition is formed between the first inner wall part and the second inner wall part, and the outer wall of the first mating portion is in an annular close fit with the first inner wall part to prevent the refrigerant from passing through a space between the outer wall of the first mating portion and the inner wall of the second body.

6. The receiver dryer according to claim 4, wherein, the outer wall of the first mating portion is not entirely in an interference fit with the inner wall of the second body, and the first mating portion is provided with a plurality of positioning flanges in a circumferential direction thereof, the filter cartridge is fixed by an interference fit formed between the positioning flanges and the inner wall of the second body, a clearance is provided between other portions of the outer wall of the first mating portion and the inner wall of the second body, a filter cap is fixedly provided on the first mating portion of the receiver dryer, and the filter cap has a base body and a screen fixed by the base body.

7. The receiver dryer according to claim 6, wherein, the second mating portion is also provided with a plurality of positioning flanges in a circumferential direction, and a space or a clearance allowing the refrigerant to flow is provided between other portions of an outer wall of the second mating portion and the inner wall of the second body; and a space allowing the refrigerant to flow is provided between the second mating portion and a portion of the second body where the first connecting port is arranged.

8. The receiver dryer according to claim 4, wherein, a clearance is provided between the first mating portion of the filter cartridge and the inner wall of the second body, an elastic sealing member is provided between the first mating portion of the filter cartridge and the inner wall of the second body, the first mating portion is provided with a groove for accommodating the sealing member, and an annular elastic sealing member is provided in the groove to form a sealing between the first mating portion and the inner wall of the second body, thereby preventing the refrigerant from passing through a space between the outer wall of the first mating portion and the inner wall of the second body.

9. The receiver dryer according to claim 4, wherein, the filter part of the filter cartridge comprises a bracket and a screen fixedly provided on the bracket, the bracket comprises a first rib arranged in an axial direction thereof and a second rib arranged in a circumferential direction thereof, and the screen is fixed by the first rib and/or the second rib; and the screen of the filter part is a nylon screen, the bracket is made of a thermoplastic material, and the screen and the bracket are integrated by injection molding.

10. The receiver dryer according to claim 1, wherein, the filter part of the filter cartridge comprises a bracket and a screen fixedly provided on the bracket, the bracket comprises a first rib arranged in an axial direction thereof and a second rib arranged in a circumferential direction thereof, and the screen is fixed by the first rib and/or the second rib.

11. The receiver dryer according to claim 10, wherein, the screen of the filter part is a nylon screen, the bracket is made of thermoplastic material, and the screen and the bracket are integrated by injection molding.

12. The receiver dryer according to claim 11, wherein, the filter cartridge is made by injection molding of thermoplastic material, and the screen is fixed by plastic; the first mating portion is provided with at least one annular sealing sheet protruding outwards from a base body thereof, the annular sealing sheet is formed integrally with the filter cartridge by injection molding, and the first mating portion is further provided with a positioning portion; the annular sealing sheet is larger than other portions of the first mating portion, and the annular sealing sheet is in contact with the inner wall of the second body.

13. The receiver dryer according to claim 11, wherein, both the second mating portion and the first mating portion of the filter cartridge are made of thermoplastic material and are formed integrally with the filter part by injection molding, and the nylon screen is fixed by injection molding as an insert in the injection molding.

14. The receiver dryer according to claim 13, wherein, the second mating portion is also fixedly provided with a screen, and the refrigerant is filtered by the filter part or the second mating portion when flowing between the first connecting port and the second connecting port.

15. The receiver dryer according to claim 1, wherein, the retaining member is axially limited by a positioning protruding portion arranged on the second body, and after the filter cartridge is mounted into the second body and the retaining member is mounted in place, the outer wall of the second body is pressed or punched to protrude inwards to form the positioning protruding portion, so as to limit the position of the retaining member.

16. The receiver dryer according to claim 1, wherein, the retaining member is a metal retaining screen fixed in the first mating portion, and the metal retaining screen is provided with a plurality of through holes; the filter cartridge is fixed to the second body via a positioning protruding portion; and after the filter cartridge is mounted into the second body, the outer wall of the second body is pressed or punched to protrude inwards to form the positioning protruding portion.

17. A method for manufacturing a receiver dryer, wherein, the receiver dryer comprises a first body and a second body, one end of the second body facing the first body has an open structure, and another end of the second body away from the first body has a first connecting port and a second connecting port; the receiver dryer comprises a filter cartridge, the filter cartridge comprises a first mating portion, a second mating portion, and a filter part at a middle portion thereof; the first mating portion fits with an inner wall of the second body, and one space allowing refrigerant to flow is provided between the filter part and the inner wall of the second body, another space allowing refrigerant to flow is formed between the second mating portion and a portion of the second body where the first connecting port is arranged, the second mating portion fits with an inner wall of the second connecting port, the space between the filter part and the inner wall of the second body is in communication with the first connecting port, an inside of the filter part is in communication with the second connecting port via the second mating portion, and the refrigerant is filtered at least once during a process of flowing between the first connecting port and the second connecting port; and wherein, the first body has a barrel-shaped structure with an opening facing the second body, a desiccant bag is provided in a cavity formed by the first body and the second body, and the desiccant bag has a molecular sieve received therein; a retaining member is provided between the filter cartridge and the desiccant bag, and the retaining member is fixed by the second body or the first mating portion of the filter cartridge; and the retaining member is provided with a plurality of through holes to ensure the flow of the refrigerant; and the method for manufacturing the receiver dryer comprises the following manufacturing steps:

machining and shaping the first body and the second body;

assembling the filter cartridge, wherein the assembling the filter cartridge comprises cutting a screen into a predetermined size and rolling the screen to form a barrel shape, and then placing the rolled and fixed screen on an injection mold and performing injection molding to obtain the filter cartridge;

mounting the filter cartridge into the second body;

mounting the retaining member in place;

pressing or punching the outer wall of the second body to make the outer wall of the second body protrude inwards to form the positioning protruding portion, to limit the position of the retaining member; and assembling the first body with the second body which has been assembled, and welding the first body with the second body after the two bodies are butted or one body is inserted into another body, to hermetically fix the first body and the second body.

18. An air-conditioning system, comprising a compressor, a heat exchanger and a receiver dryer connected to the compressor or the heat exchanger, the receiver dryer comprising a first body and a second body, one end of the second body facing the first body having an open structure, and another end of the second body away from the first body having a first connecting port and a second connecting port, wherein, the receiver dryer comprises a filter cartridge, the filter cartridge comprises a first mating portion, a second mating portion, and a filter part at a middle portion thereof; the first mating portion fits with an inner wall of the second body, one space allowing refrigerant to flow is provided between the filter part and the inner wall of the second body, another space allowing refrigerant to flow is formed between the second mating portion and a portion of the second body where the first connecting port is arranged, the second mating portion fits with an inner wall of the second connecting port, the space between the filter part and the inner wall of the second body is in communication with the first connecting port, an inside of the filter part is in communication with the second connecting port via the second mating portion, and the refrigerant is filtered at least once during a process of flowing between the first connecting port and the second connecting port; and wherein, the first body has a barrel-shaped structure with an opening facing the second body, a desiccant bag is provided in a cavity formed by the first body and the second body, and the desiccant bag has a molecular sieve received therein; a retaining member is provided between the filter cartridge and the desiccant bag, and the retaining member is fixed by the second body or the first mating portion of the filter cartridge; and the retaining member is provided with a plurality of through holes to ensure the flow of the refrigerant.

* * * * *